United States Patent [19]
Vlcek et al.

[11] Patent Number: 5,493,694
[45] Date of Patent: Feb. 20, 1996

[54] FAST RESPONSE SYSTEM FOR A FLEET OF VEHICLES

[75] Inventors: Charles Vlcek, Greenland, N.H.; James Reynolds, San Jose, Calif.

[73] Assignee: Trimble Navigation Limited, Sunnyvale, Calif.

[21] Appl. No.: 148,998

[22] Filed: Nov. 8, 1993

[51] Int. Cl.$^6$ .................................................. H04B 7/26
[52] U.S. Cl. ...................... 455/53.1; 455/54.1; 455/54.2
[58] Field of Search .................................. 455/12.1, 33.1, 455/54.1, 54.2, 56.1, 53.1, 57.1, 58.1; 340/988, 989

[56] References Cited

U.S. PATENT DOCUMENTS

| | | | |
|---|---|---|---|
| 4,907,290 | 3/1990 | Crompton | 455/54.1 |
| 5,029,234 | 7/1991 | Kawai et al. | 455/54.1 |
| 5,068,654 | 11/1991 | Husher | 455/54.1 |

*Primary Examiner*—Edward F. Urban
*Assistant Examiner*—Thanh Le
*Attorney, Agent, or Firm*—John Schipper

[57] ABSTRACT

A method for directing a vehicle from a fleet of N vehicles, numbered $n=1, 2, \ldots, N (N \geq 2)$, to respond to a call for assistance received at a central processing station that communicates with a communications unit on each of these vehicles. The central station receives information by radio wave signals on the present location and present status of each vehicle on patrol at a sequence of times. Optionally, the vehicles may be divided into mutually exclusive groups, with each group reporting its location and status at separate times with different frequencies of reporting. An information response interval for a group includes a number of time slots, with each time slot allocated to a vehicle in the group so that no slot is empty. When the central station receives a call for assistance, an assistance message is transmitted to the fleet, specifying the site at which assistance is needed and any available information on the nature of the assistance required. Each available vehicle receives the assistance message and determines its distance $d(n)$ from the assistance site. Each available vehicle whose distance $d(n)$ is no greater than a selected distance D replies to the assistance message by transmitting its status and distance $d(n)$ to the central station with a time delay that is proportional to $d(n)$. Vehicle selection may be based upon first-to-reply and/or upon any specialized equipment or personnel training needed to respond. Vehicle location may be determined by GPS, GLONASS, Loran, or any other suitable location determination system.

34 Claims, 4 Drawing Sheets

FAST RESPONSE SYSTEM FOR A FLEET OF VEHICLES

FIELD OF THE INVENTION

This invention relates to a communication system for providing fast response to an incident by one of a fleet of vehicles operating within a region.

BACKGROUND OF THE INVENTION

When a central station that controls a fleet of vehicles, such as police cars, taxicabs or ambulances, receives a call for assistance, one question of immediate concern is which vehicle can respond most quickly to the call. A 911 or taxicab dispatcher will normally question the caller and determine the type of assistance needed and the location of the caller, using a Geographic Information System (GIS) or similar database to identify the caller's location on a grid or other coordinate system. The dispatcher must now determine which vehicle or vehicles is in the best position to respond to the call, based upon vehicle availability, vehicle proximity to the caller's location, special equipment and/or personnel training needed for response to this call, and possibly other factors. Vehicle availability and proximity to the caller's location require current information on each of the fleet vehicles.

If the number of vehicles in the fleet is small (e.g., five) and not too widely dispersed, it may be feasible to contact each vehicle by radiowave and learn the vehicle's present location and availability every 15–30 seconds. However, if the fleet is a large one (e.g., with 200 or more vehicles), this frequent interrogation/response mode cannot be implemented using a single channel or a reasonably small number of channels. For example, the New York City Police Department has a fleet of about 4600 vehicles, and about 5 police vehicles per second can report their present location and availability or status. If 16 channels are dedicated for such reporting, assuming 5 reports per second in a round-robin system, each vehicle can report at most once in a time interval of length 58 seconds. Further, some police vehicles that are currently in the "pursuit or deployment" mode should report their present location and status more often, perhaps once every ten seconds, and a round-robin system that assigns uniform priorities to each vehicle is not appropriate here. Further, some vehicles may not be on patrol nor operational at any given time, and interrogation of the present availability and/or location of such vehicles (which will not respond) is a waste of air time.

Local area networks (LANs) whose stations communicate by cable signals or by radio waves often face a problem of collision of two or more signals sent by one station to another station, where the content of both signals may be lost. In one of the original LANs, the ALOHA network connecting five of the Hawaiian islands, the signal collisions were severe enough that the ALOHA system experimented with an allocation of specific time slots for each station, which was of some help in the small ALOHA system. This is discussed in some detail by Mischa Schwartz in *Computer-Communication Network Design and Analysis*, Prentice Hall, 1977, pp. 288–320. A fixed allocation of time slots is wasteful if many of the responding stations are not operative at a given time.

Another popular approach for LANs is CSMA/CD, or carrier sense, multiple access with collision detection, in which any station may contend for "possession" of the air waves for a selected maximum time. Signal collisions are partly avoided by having each station listen to sense the presence of one or more carriers (indicating that a message is presently being transmitted by another station) before transmitting. Collisions are still a problem here, and another collision reduction algorithm is often imposed on the stations. One popular algorithm, known as random backoff, requires two stations whose signals have collided (and any other station that senses the presence of this signal collision) to "back off" or refrain from further transmissions for a randomly determined time drawn from a time interval of selected maximum length, such as 16 seconds. Schwartz, ibid, shows that, without time slot allocation, a system will theoretically saturate, so that signal collisions allow substantially no transmissions, as soon as at least 19 percent of the stations are attempting to transmit. If time slot allocation is implemented, the threshold at which saturation will occur improves to about 37 percent. These results indicate that saturation can be continually present where a large fleet of vehicles communicates with a central station, even with modest throughput requirements, unless the communication protocol is carefully selected and implemented.

Where system saturation is a concern, some workers have assigned general time slots for use in exchanging information between stations. Fujiwara, in U.S. Pat. No. 4,513,416, discloses a TDMA satellite-communication system with a ground station that counts the number of idle time slots in each uplink or downlink signal. When this idle number exceeds a selected number, one of the idle time slots in an uplink and in a down link signal is assigned to time axis adjustment and is no longer available for its original use. However, at any time some of the time slots may be idle and unused.

A radio communication system that adapts itself to the amount of signal traffic is disclosed in U.S. Pat. No. 5,103,445, issued to Ostlund. A receiving station determines whether a given time slot allocated for transmission is likely to be filled or empty, based on the signal traffic sensed by the station in a time slot used for an earlier invitation-to-transmit message. This patent disinguishes between three types of time slots (containing an understandable message, empty, and mutilated) as they appear in the system.

In U.S. Pat. No. 5,168,271, Hoff discloses a packet-based paging and timekeeping system in which time slot identification is used to transfer packets from a station on one network to a receiver on a second network. A sequence of time slots is allocated, and a packet is transmitted during a selected time slot that corresponds to and identifies the addressee network.

Yamao, in U.S. Pat. No. 5,203,024, discloses an antenna selection system that selects a particular antenna for signal reception in a specified time slot, based upon comparison of a predicted signal quality parameter for each of the antennas. The parameter may be present error rate, receive level at the center of the assigned slot, minimum receive level required, or some other parameter.

Another antenna selection system is disclosed in U.S. Pat. No. 5,203,026, issued to Ekelund. Antenna selection for the present time slot is based upon comparison of the signal quality in the immediately preceding time slot for each of a plurality of antennas.

In U.S. Pat. No. 5,126,733, Sagers et al disclose a polling system for a plurality of location determination units, here Loran signal receivers. A polling station can transmit an interrogation signal, requesting location information from all receiving stations. Alternatively, a polling station can request location information from a specified station.

Other workers have used a known signal transmission backoff algorithm in the presence of signal collisions, to reduce the likelihood of subsequent signal collisions. Hochsprung et al disclose a local area network with carrier sense collision avoidance, using a signal backoff, in U.S. Pat. No. 4,661,902. If a first station, wishing to transmit, senses the presence of a carrier or other indicia of a second station's signal, the first station executes a signal backoff for a time $R \Delta t$, where $\Delta t$ is a selected number (100 μsec) and R is a positive integer that is randomly chosen based upon recent network experience with signal collisions.

In U.S. Pat. No. 5,018,138, Twitty et al disclose a signal backoff algorithm for a network of communicating stations. A first station, wishing to transmit, that senses the presence of a signal already transmitted by a second station, waits for a backoff period of length specified by the I.E.E.E. 802.3 truncated binary exponential backoff standard. The backoff time is a selected time $\Delta t$ multiplied by a random integer R that is uniformly distributed over an integer interval defined by $0<R<\exp[\min(I0, n)]$, where n is a statistically determined number of signal collisions in a selected time interval for the network, based upon recent experience and I0 is a selected integer.

The I.E.E.E. 802.3 truncated binary exponential backoff standard is also adopted for signals in response to collision detection in U.S. Pat. No. 5,164,942, issued to Kamelman et al. None of these patents uses a deterministic, as opposed to statistically determined, backoff time based upon some physically measurable quantity that is distinct for each station.

Some of these systems use signal analysis in a given time slot to determine whether a signal should be transmitted, or received, during that time slot or a subsequent time slot but do not provide an approach that reduces the required number of time slots to a minimum. Other systems use well known transmission backoff algorithms that do not take account of the special needs of a fast response system for a fleet of vehicles that continuously communicates with a central station.

What is needed is a system for communication between a central station and each vehicle in a fleet that: (1) allows the central station to poll the present status and location and other necessary information for each vehicle with a frequency that need not be uniform for all vehicles in the fleet; (2) allows the central station to advise each fleet vehicle of the location and other necessary information for each call for assistance received by the central station; (3) allows each fleet vehicle to determine its present distance from the location of a call for assistance and to advise the central station if that vehicle is within a selected distance of the caller; (4) allows each fleet vehicle to communicate with the central station, using a protocol that minimizes the likelihood of signal collision; (5) allows the central station to adjust the criteria to be used, including but not limited to a vehicle's proximity to the caller's location, in determining which vehicle(s) will respond to a call for assistance; and (6) performs these tasks with a minimum of radio channels and does not saturate as 100 percent utilization is approached.

SUMMARY OF THE INVENTION

These needs are met by the invention, which provides a system for communication between each vehicle in a fleet and a central station, where the present status and location of each vehicle is to be reported to the central station with a reporting frequency that may vary with each vehicle and may vary with time as well.

The Invention provides information on the present location and status of each of a fleet of vehicles and of any "incident" to be responded to, and can direct a vehicle that is "closest to" the site of the incident to report to that site. The system works with a small or large number N of vehicles, numbered $n=1, 2, \ldots, N$, each of which has a location determination (LD) unit including an LD signal antenna and LD signal receiver/processor (providing a location fix every 0.5–5 seconds), a radiowave transceiver, and an LD receiver/processor-transceiver interface connecting the indicated devices. The radiowave transceivers all communicate with a central processing station that has a similar transceiver but need not have an LD antenna or LD receiver/processor. At any given time: (1) a first portion N1 of these vehicles are "parked", unavailable or otherwise not in operation; (2) a second portion N2 of these vehicles are already assigned or responding to other incidents, and thus am not available to respond to a call; and (3) a third portion N3 of these vehicles are on patrol, and not in pursuit or otherwise deployed, and are thus available to respond to a call for assistance or service, where N1+N2+N3=N. The LD signals used for location determination may be produced and analyzed by a Global Positioning System (GPS), a Global Orbiting Navigational System (GLONASS), any other satellite-based system, a Loran or similar system, an FM subcarrier system, or any other system that uses electromagnetic waves to determine location.

At a selected time, the central station broadcasts an interrogation signal in a time slot of length $T_c(\approx 1 \text{ sec})$, requesting that vehicles number $n=n_1, n_2, \ldots$ in a selected group of k(q) vehicles respond with the present location and status of each vehicle. Using a protocol known by the central station and by each of the vehicle transceivers, the central station then ceases its broadcast and waits a certain time interval of length $T_v$ for the vehicle responses. This time interval is divided into k(q) sub-intervals or time slots, each of approximately equal length $\Delta t_q = T_v/k(q)$ ($\approx 50$–500 msec), and vehicle number $n=n_r$ replies with the requested information during the rth consecutive time slot. Transceiver $n_r$ (in vehicle number $n_r$) has listened to the central station's interrogation signal and knows (1) whether it is one of the transceivers queried and (2) if it has been queried, what is its numerical position in the queue for responding to this query. If a particular transceiver is not among those queried, that transceiver ignores the interrogation signal and waits for the next interrogation signal. With the interrogation/response time intervals thus allocated, only the k(q) transceivers whose numbers are broadcast or otherwise identified respond to the central station, and each such transceiver responds only in its allocated time slot. Each interrogation signal sent by the central station can be directed to a different group of vehicle transceivers, and the number the k(q) in each such group can vary from one interrogation group to the next. Further, if one group of vehicles needs to be interrogated more frequently than other groups, this is easily accomplished. Using this protocol, a time interval allocated to interrogation of, and responses from, k(q) vehicle transceivers is "collapsed" to a time interval of length 2–3 seconds for a group of $k(q) \approx 10$ vehicles. Undiscriminating interrogation of a group of, say, 200 vehicle transceivers could require 40–120 seconds by conventional approaches. Interrogation of non-parked vehicles can be done in different size groupings, and different vehicle groups can be interrogated at different frequencies.

When the central station receives a call requiring assistance, such as response to a break-in or robbery in progress (an "incident"), the central station broadcasts an incident message that includes the location of the incident and whatever is known about the incident. Each vehicle message unit (n) receives the incident message, determines its present location and the distance d(n) from that vehicle to the site of the incident, determines if that vehicle can respond to the incident (i.e., whether the vehicle is presently in an available mode), and replies to the incident message by transmitting its present location and other pertinent information. The vehicle message unit (n) transmits this reply if and only if the distance d(n) is less than a predetermined distance D, which might be in the range 0.5–3 miles, depending upon the estimated density of vehicles near the incident site. Any vehicle LD unit whose distance d(n) is greater than the predetermined distance D does not respond. Each patrolling vehicle whose distance $d(n) \leq D$ does not reply immediately but waits a certain backoff time that is equal to $Md(n)(T-\tau)/D$ where M is a selected constant, T is a selected transmission cut-off time, and $\tau$ is a selected vehicle communication unit response time. Thus, the vehicle LD units reply in order of their distance d(n) from the site of the incident, with the closest LD unit replying first. The radio system used for this reply may provide one channel or many channels for replies to incident messages.

If certain vehicles have special equipment, or if the occupants of certain vehicles have specialized training, and such equipment or training is needed for the response to such incident, the central station need not select the first-to-respond vehicle to respond to the incident. The central station may select the first vehicle (and vehicle occupants) that replies and has the needed equipment or personnel training.

An optional reply transmission cut-off time, or length of a time-out interval, T, which begins as soon as a transceiver receives the incident message, defines the maximum time interval for the vehicle transceivers to reply, after which no further replies are transmitted. Use of this time-out limit (optional) limits the number of vehicle transceivers that can reply, a useful feature if the number of vehicles near the incident site is large.

The invention will provide the greatest benefits where a large fleet of vehicles is used, probably in an urban environment. Although the invention has been discussed with reference to a fleet of police vehicles, the invention will work equally well with a fleet of taxicabs or a fleet of radio-dispatched service vehicles, such as ambulances, vehicle towing trucks or other emergency or general service responders.

DESCRIPTION OF BEST MODE OF THE INVENTION

Figure 1:
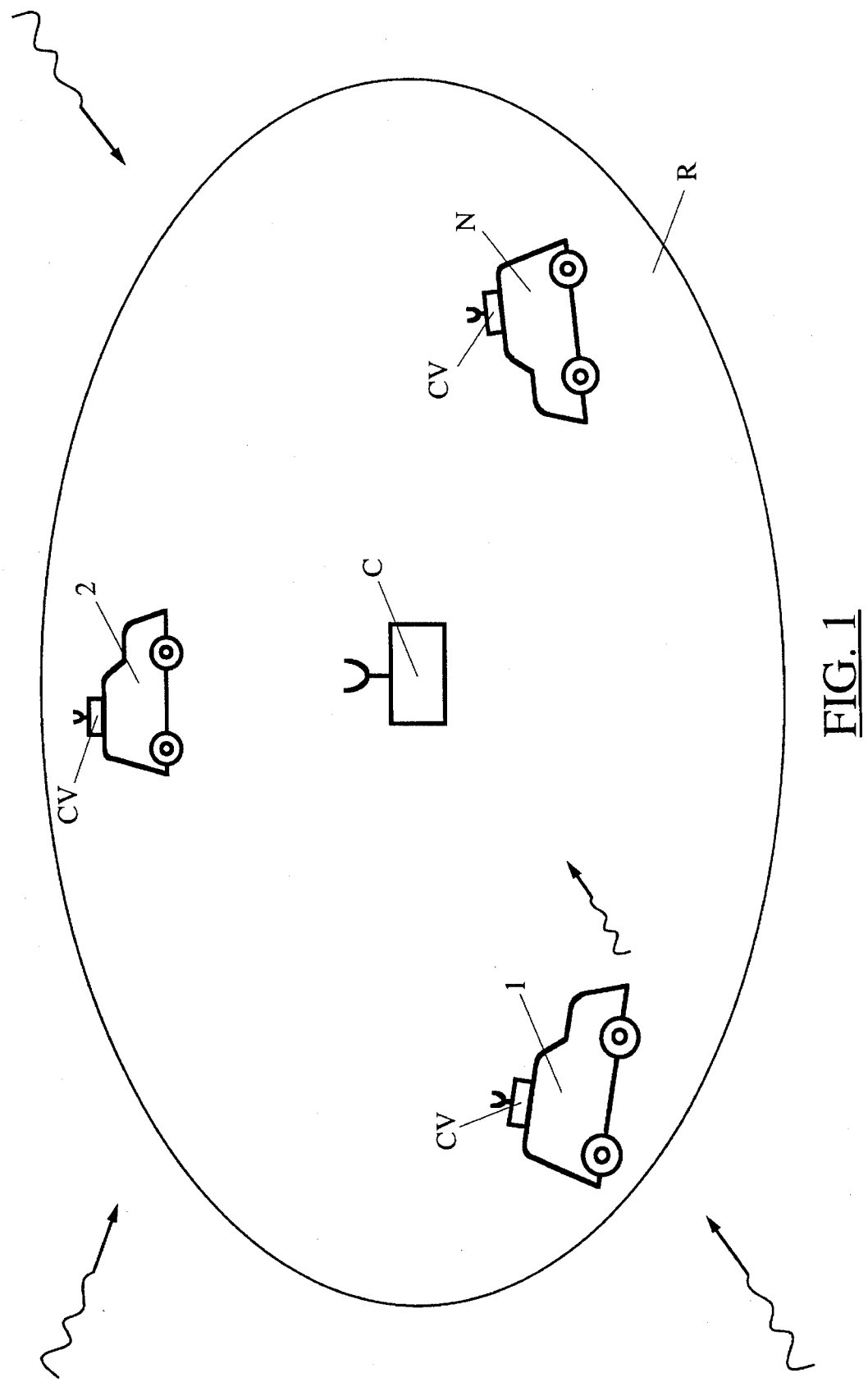
FIG. 1 illustrates the invention in use in a large region R.

FIG. 1 illustrates use of the invention in one embodiment. A number N of vehicles, numbered n=1, 2, . . . , N, operate in a region R and individually communicate with a central processing station C by means of electromagnetic wave signals (radiowaves, infrared, optical, etc.), referred to as "radiowaves" for convenience herein. The central processing station C periodically interrogates one or a group of vehicles to determine: (1) the vehicle status ("parked" or inoperative, on patrol and available, on patrol but not available because it is responding to an incident or call for assistance, etc.); (2) the present location of each vehicle; and (3) other necessary information concerning the vehicle and/ or its occupants.

Figure 2:
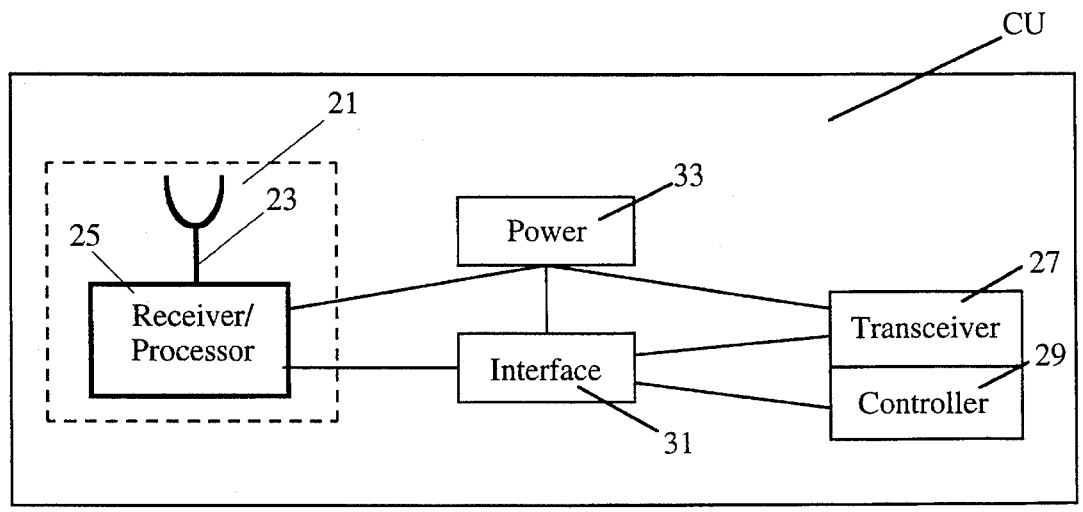
FIG. 2 is a schematic view of a location determination unit carried on a fleet vehicle according to the invention.

As illustrated in FIG. 2, each vehicle carries a communication unit CU that includes the following components: (1) a location determination unit 21 including an LD signal antenna 23 and LD signal receiver/processor 25 to receive and process LD signals and to determine the present location of the LD signal antenna; (2) a transceiver 27 and transceiver controller 29 that allows exchange of radiowave communications with the central station C (FIG. 1 ), using selected protocols that are stored for use in the transceiver controller; (3) an interface 31 between the LD signal receiver/processor 25 and the transceiver 27 and transceiver controller 29, to allow exchange of information and requests for information; and (4) a power supply 33 that supplies electrical power for one or more of the other components.

Figure 3:
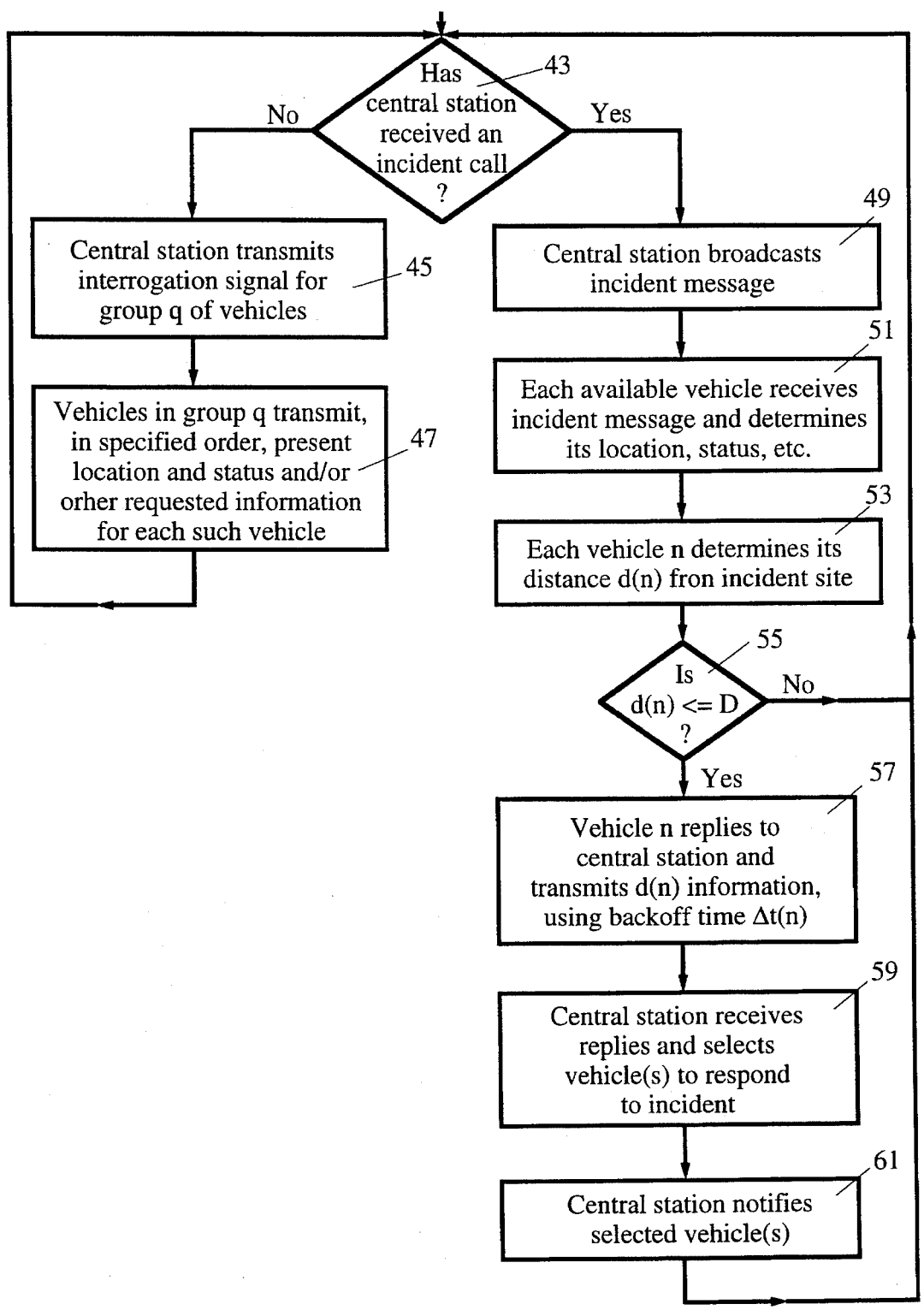
FIG. 3 illustrates a procedure for determining which fleet vehicle will respond to a call for assistance, according to the invention.

FIG. 3 illustrates a procedure according to the invention. The vehicles are divided into K groups of vehicles, which may be mutually exclusive, numbered q=1, 2, . . . , K, where each group may have the same or a different number of vehicles. Each vehicle in a group has approximately the same reporting interval length so that the central station can interrogate each group of vehicles together. At each of a selected sequence of times, the central station determines if it has recently received an incident call, in step 43.

If the central station has not recently received an assistance or incident call, the central station broadcasts an interrogation signal, in step 45, in a time slot of length $T_c$ ($\approx$0.2–1 sec), requesting that the communication units for vehicles number $n=n_1, n_2, \ldots, n_{k(q)}$ in a selected group q respond with the present location and status of the vehicle and/or other requested information.

Using a protocol known by the central station and by each of the vehicle communication units, the central station then ceases its broadcast and waits a certain time interval of length $T_v$ for the responses of the vehicles number $n_1, n_2, \ldots, n_{k(q)}$. This time interval is divided into k(q) sub-intervals or time slots, each of length approximately $\Delta t_q = T_v/k(q)$ ($\approx$50–500 msec, preferably $\approx$200 msec), and vehicle number $n=n_r$ responds with the requested information during the rth consecutive time slot, in step 47. Optionally, the vehicles in group q can reply to the interrogation in numerical order or in reverse numerical order, according to their respective vehicle numbers in that group. The system then recycles to step 43.

Optionally, the central station can determine which vehicles are currently operating and include only operating vehicles among an interrogated subset $\{n_1, n_2, \ldots, n_k\}$ of vehicles, or can interrogate all vehicles in the various groups. Optionally, the central station can separately interrogate the non-operating vehicles in one or more separate subsets and determine when a vehicle transfers from non-operational to operational status, or inversely, so that such a vehicle can be assigned to an appropriate subset of interrogated vehicles.

Transceiver $n_r$ (in vehicle number $n_r$) has listened to the central station's interrogation signal and knows (1) whether it is one of the transceivers queried and (2) if it has been queried, what is its numerical position in the queue for responding to this query. If a particular transceiver is not among those queried, that transceiver ignores the interrogation signal until receipt of the next interrogation signal from the central station. With the interrogation/response time intervals thus allocated, only these k(q) transceivers whose numbers are specified will transmit a response to the central station interrogation signal, and each such transceiver transmits a response only in its allocated time slot, transmitting its present status, location and any other requested information. Although the central station may not have received the present status and location of a given vehicle within, say, the last 15 seconds, a vehicle LD unit determines its own present status and present location at prescribed time intervals, for example second-by-second or more often.

Each interrogation signal sent by the central station can be directed to a different group q of vehicle communication units, and the number k(q) of vehicles in each such group can vary from one interrogation group to the next. Further, if one group of vehicles needs to be interrogated more frequently than other groups, this is easily accomplished. Using this protocol, a time interval allocated to interrogation of, and responses from, k(q) vehicle transceivers is "collapsed" to a time interval of length $T_c+k(q)T_v$, which can be of the order of 2–3 seconds for a group of k(q)=10 vehicles. Undiscriminating interrogation of a group of, say, 200 vehicle transceivers could require 40–120 seconds by conventional approaches. Interrogation of operational vehicles can be done in different size groupings, and different vehicle groups can be interrogated at different frequencies, if desired.

Assume that the central station has recently received an assistance or incident call, requiring assistance or service, such as a break-in or robbery in progress (an "incident"), in step 43. The central station preferably stops its periodic transmission of interrogation signals temporarily when the central station receives an incident call. In step 49, the central station broadcasts an incident message containing the location of the incident and whatever is known about the incident, possibly in a coded message that is understood by the vehicle communication units. Each vehicle communication unit n receives the incident message, in step 51, and determines its present location and status and determines the distance d(n) from that vehicle's LD unit to the site of the incident, in step 53. In step 55, the vehicle communication unit n determines if that vehicle can respond to the incident; that is, whether the vehicle distance d(n) from the incident site is no greater than a predetermined distance D, which might be in the range 0.5–3 miles, depending upon the estimated density of vehicles near the incident site. Any vehicle LD unit whose distance d(n) is greater than the predetermined distance D does not reply to the incident message transmitted by the central station, and this part of the system recycles to step 43.

The transceiver in each available vehicle whose distance is d(n)≦D does not respond immediately, because this might produce signal collisions. In step 57, each transceiver number n waits at least a certain backoff time $\Delta t(n)=Md(n)(T-\tau)/D$ and then transmits a reply, where T is a selected reply transmission cut-off time, $\tau$ is a vehicle communication response time, and M is a selected positive constant that may depend upon the selected distance D, the radio system used, the number of vehicles in the fleet that are likely to be within a distance D of the incident site, and other parameters. The constant M may be selected independently for each incident message, if desired. Typically, the cut-off time T might be 2–20 sec and the response time $\tau$ might be 50–500 msec. Preferably, T≈2–10 sec, $\tau$≈50–200 msec and M≈1.

Table 1 presents a representative set of reply backoff times $\Delta t(n)$ for the choices M=1, T=1 sec, $\tau$=0.2 sec and D=1600 meters. Note that the difference in backoff times for each increase by 100 meters in the distance d(n) is 613 msec, which is probably adequate to avoid collision of reply signals transmitted by two vehicles whose distances d(n) from the incident site differ by 100 meters or more. More generally, the reply signal backoff time may be defined as $\Delta t(n)'=Md(n)(T-\tau)/D+\Delta t_0$, where $\Delta t_0$ is an arbitrary small time value that may be positive or negative or zero.

TABLE 1

Reply Signal Backoff Time Versus Incident Site Distance
M = 1, T = 10 sec, t = 0.2 sec, D = 1600 meters

| d(n) | Backoff Time |
|---|---|
| 100 M | 0.613 sec |
| 200 | 1.225 |
| 300 | 1.838 |
| 400 | 2.450 |
| 500 | 3.063 |
| 600 | 3.675 |
| 700 | 4.288 |
| 800 | 4.900 |
| 900 | 5.513 |
| 1000 | 6.125 |
| 1100 | 6.738 |
| 1200 | 7.350 |
| 1300 | 7.963 |
| 1400 | 8.575 |
| 1500 | 9.188 |
| 1600 | 9.800 |

Because each replying transceiver waits a backoff time that is proportional to its distance d(n), the LD unit with the shortest distance d(n) will reply first; the LD unit with the second shortest distance d(n) will reply second; and so on. The central station receives the replies to the incident message and selects one or more vehicles to respond to the incident call, in step 59. The distance D in the requirement d(n)≦D can be chosen so that no more than 3–12 vehicle transceivers are likely to reply to an incident message. The central station may select the first-to-reply vehicle(s) or some other vehicle(s) to respond to the incident. The central station notifies the selected vehicle(s), in step 61, and then recycles to step 43.

The constant M is preferably selected to make it mow likely that the first reply signal to the incident message, or the first few replies, is not mutilated by collision with another reply signal. The second-to-reply vehicle transceiver can sense the presence of the reply signal from the first-to-reply vehicle transceiver and not reply immediately, in order to avoid a collision of reply signals. This choice of (minimum) backoff time $\Delta t(n)$ does not, of course, guarantee that a collision of reply signals will not occur, but this choice reduces the likelihood significantly.

If avoidance of reply signal collisions is very important, the radiowave system used for such replies may be a carrier sense, code division with multiple access (CDMA) that provides a plurality of reply channels for the transceivers. If vehicle transceiver number n attempts to reply to an incident message, after waiting a reply backoff time $\Delta t(n)$, and finds that one channel is presently occupied, that transceiver could choose another channel that is not occupied to transmit its reply signal to the central station.

If certain vehicles have special equipment, or if the occupants of certain vehicles have specialized training, and such equipment or personnel training is needed for the response to such incident, the central station need not select the first-to-reply vehicle to respond to the incident. The central station may select the first vehicle (and vehicle occupants) that replies and has the needed equipment or personnel training. The specialized equipment and/or specialized personnel training associated with a given vehicle or its occupants may be specified and stored at the central station or may be transmitted in a reply to an incident message by that vehicle.

The system may include a time-out interval that begins at each vehicle CU when that CU first receives the incident message from the central station. This time-out interval has a selected length T, which may be chosen so that no more than a selected number P of replies can be transmitted, in concatenated form, by the vehicle transceivers during this time-out interval. Use of this time-out feature will set a maximum P on the number of replies to an incident message that are received by the central station, even if a larger number of vehicles is clustered within a distance D of the incident site.

The incident location and appropriate details are broadcast by the central station, and each vehicle communication unit itself determines its distance d(n) from the incident site. Only a small number of vehicles within a selected distance D respond to the incident call, thus keeping the air relatively quiet. Optionally, each replying vehicle transceiver responds after a backoff time that is proportional to this distance d(n) so that the probability of collisions from response signals by the first-to-reply vehicles is reduced significantly. Finally, the central station can take account of the need for special equipment or special personnel training in determining which vehicle or vehicles will respond to a given incident call.

Figure 4:
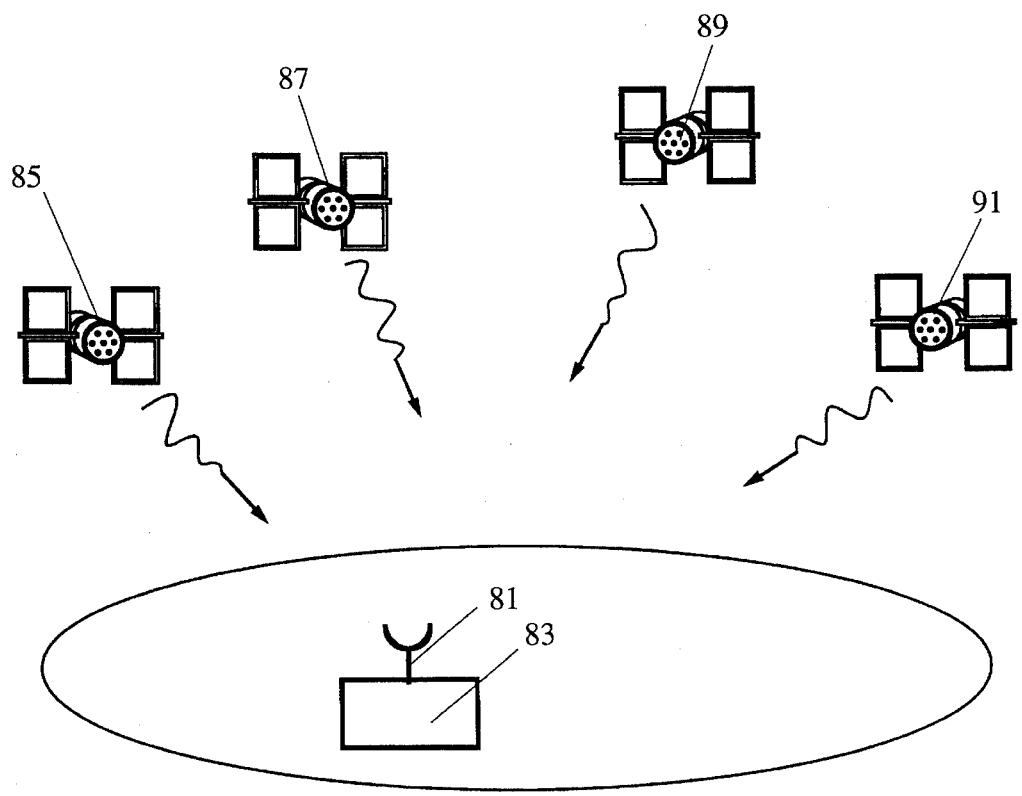
FIGS. 4–6 illustrate particular location determination systems that can be used to practice the invention.

The LD unit may be a Navstar Global Positioning System (GPS), a Global Orbiting Navigation System (GLONASS), or other satellite-based location determination system, as illustrated in FIG. 4 and discussed below. In FIG. 4, a GPS signal antenna 81 and GPS signal receiver/processor 83 are part of an LD system that receives GPS signals from three or more GPS satellites 85, 87, 89, 91, etc. Each of these satellites follows a known non-geosynchronous orbit and transmits a distinguishable message at one or both of the frequencies 1.227 GHz (L2 carrier) and 1.575 GHz (L1 carrier). The GPS antenna and associated receiver/processor 81 and 83 receive the GPS signals from the different satellites at different times and different rates (through the Doppler shift) and determine the location of the GPS signal antenna based upon these differences. The Navstar Global Positioning System is discussed in Tom Logsdon, *The Navstar Global Positioning System*, Van Nostrand Reinhold, 1992, esp. pp. 1–90.

Figure 5:
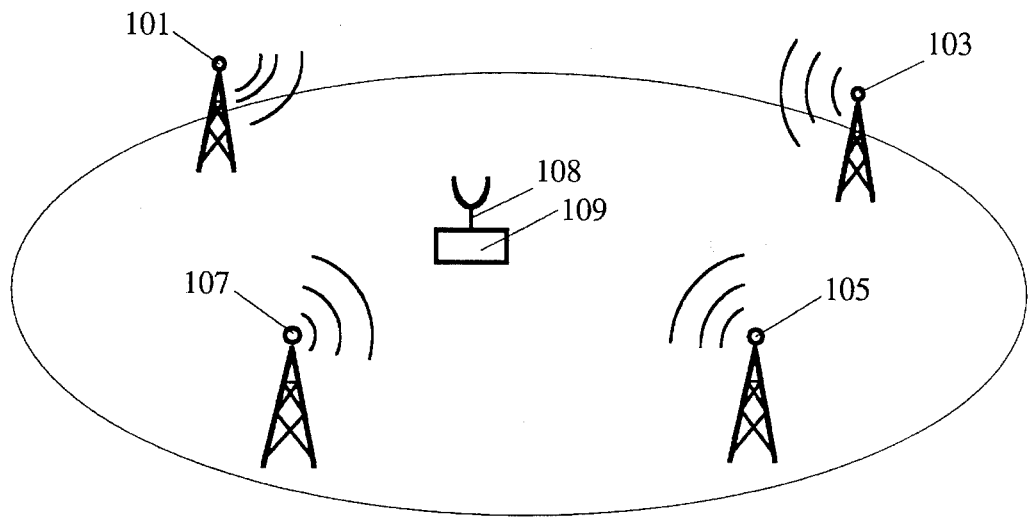

Another suitable location determination unit uses the Loran-C system (or a similar ground-based system, such as Omega, Decca, VOR/DME Tacan, Microwave Landing System, Joint Tactical Information Distribution System Relnav, Position Location Reporting System, or an inertial navigation system), which uses a plurality of ground-based radiowave sources on a tower, spaced apart approximately 100–300 km at fixed, known locations, with each source transmitting phase-synchronized signals with a 100 kHz carrier wave whose shape resembles a damped sinusoidal wave. These signals travel at somewhat different propagation velocities over land and over a water body, but these differences are known and can be compensated for. The Loran-C system is discussed in *Loran-C User Handbook*, Commandant Instruction M16562.3, published by the U.S. Coast Guard, U.S. Department of Transportation, May 1980, and is incorporated by reference heroin. The Omega, Decca, Tacan, MLS, JTIDS Relnav, PLRS and inertial navigation systems are discussed in Logsdon, op cit. FIG. 5 illustrates use of a Loran system for location determination. Three or more (preferably at least four) Loran signal towers 101,103, 105 and 107 broadcast Loran signals that are received by a Loran signal antenna 108 and Loran signal receiver/processor 109. The location of the antenna 108 is determined by analysis of the relative phases of the Loran signals, using intersections of hyperboloidal surfaces defined by these relative phases.

Figure 6:
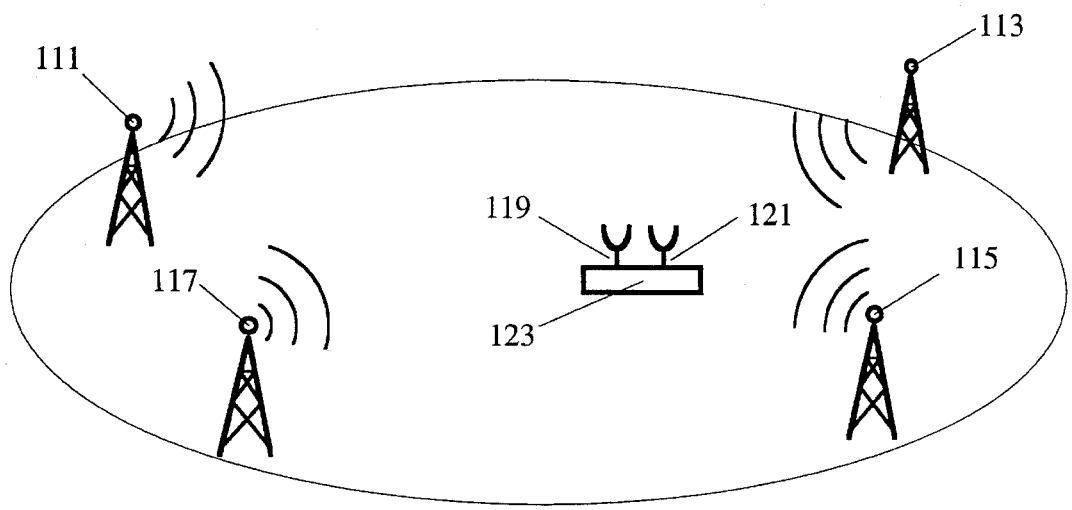

Another suitable location determination unit uses FM subcarrier signals transmitted from three or more FM subcarrier signal sources, such as FM radio station, as illustrated in FIG. 6. Here, four or more FM subcarrier signal sources 111, 113, 115 and 117, which may be FM radio towers, transmit FM subcarrier signals, displaced from the standard FM carrier frequencies by about 19 kHz or a multiple thereof. At least one of these FM signal sources knows or determines the relative phases of the other FM sources (as transmitted) and transmits this relative phase information to a first antenna 119 at the mobile user station. The user station also receives the FM subcarrier signals from the sources 111, 113, 115 and 117 at an FM subcarrier signal antenna 121. An FM subcarrier signal receiver/processor 123 receives the signal information from the antennas 119 and 121 and determines the present location of the user station. One approach for use of FM subcarrier signals for location determination is discussed by Kelley et al in U.S. Pat. No. 5,173,710, which is incorporated by reference herein.

FM subcarrier signals can be used for determination of the location of a vehicle, inside and outside buildings and other structures. This approach has the advantage of simplicity: only one set of radiowaves is used for location determination. FM signals are less subject to noise and other interference than are other signals, such as AM signals. However, FM signals, including subcarrier signals, are usually limited to reception distances of no more than 40–120 km, which may limit use of the invention to local regions having a diameter of 80 km are less. Thus, it may be preferable to combine use of the FM subcarrier signal system, for location determination inside buildings and other structures where high frequency electromagnetic signals cannot penetrate, with a long distance or global location determination system that can be used outdoors and wherever else this system's signals can be received.

Any of the above-described location determination technologies can also be combined with other sensor technology, such as dead reckoning, gyroscope alignment, odometer readings, altimeter readings and other measurements, to augment and enhance the accuracy and continuity of the location determination fixes.

The invention has been demonstrated by application to calls for assistance from a police department. The invention also applies to calls for assistance from a company that maintains a fleet of taxicabs, of ambulances, of vehicle towing trucks, or of any other radio-dispatched general service providers or emergency service providers.

We claim:

1. A method for directing a vehicle drawn from a plurality of vehicles to respond to a call for assistance received at a central station that communicates with these vehicles, the method comprising the steps of:

providing a central processing station, which receives calls for assistance, with a transceiver that transmits and receives radio wave signals at a first selected frequency;

providing each of a selected set of N vehicles (N≧2) with a communications unit that comprises:

location determination means for receiving radio wave location determination signals at a second selected frequency and for processing these location determination signals to determine the present location coordinates of the location determination means at each of a sequence of consecutive times that are on average no more than five seconds apart;

transceiver means for transmitting radio wave signals to, and receiving radio wave signals from, the central station transceiver at the first selected frequency; and an interface and transceiver controller, connected to the location determination means and the transceiver means and for controlling the transceiver means, that allows communication of information between the location determination means and the transceiver controller, that processes the radio wave signals received from the central station, that determines what signal the transceiver means should transmit in response to the radio wave signals received from the central station, and that determines the present status of the vehicle associated with the communications unit;

causing the central station to obtain information on the present location and present status of each vehicle at a sequence of consecutive times from the communications unit associated with each vehicle;

when the central station receives a call for assistance and the location of the caller for that assistance, causing the central station to transmit to the vehicles an assistance message containing this location and available information concerning the assistance required;

causing the communications unit for each vehicle that is available to respond to a call for assistance to determine its distance d from the location specified in the assistance message, and if the distance d is no greater than a selected distance D, causing the vehicle communications unit to reply to the assistance message by transmitting the vehicle status and information allowing determination of the distance d to the central station; and causing the central station to select one or more of the set of N vehicles to respond to the call for assistance and to notify each selected vehicle of its selection to respond to the call for assistance.

2. The method of claim 1, wherein said step of causing said central station to obtain information on said present location and present status of each of said selected set of vehicles comprises the following steps:

assigning each of said selected set of vehicles to one of K groups, numbered k=1, 2, ..., K with K≧2, of said vehicles;

transmitting a request by said central station for information on said present location and said present status of each of said vehicles in the kth group at each of a sequence of consecutive times, for k=1, 2, ..., K, where any two groups of said vehicles receive such information requests at different times; and causing said communications unit in each of said vehicles in the kth group to respond to the information request transmitted to the kth group by transmitting to said central station said present status and information allowing determination of said present location of each of said vehicles in the kth group, in a selected information response time interval following receipt by said vehicles in the kth group of the information request.

3. The method of claim 2, wherein the frequency of transmission of said information requests for a selected first group of said selected set of vehicles differs from the frequency of transmission of said information requests for a selected second group of said selected set of vehicles.

4. The method of claim 2, further comprising the steps of:

assigning each of said vehicles in said kth group to a selected non-overlapping sub-interval of time within said selected information response time interval; and causing each of said vehicles in said kth group to transmit to said central station information on said present location and present status of said vehicle within the sub-interval of time assigned to said vehicle.

5. The method of claim 4, wherein the sum of said non-overlapping sub-intervals of time is substantially equal to said selected information response time interval for said kth group of said vehicles.

6. The method of claim 4, wherein each of said vehicles in said kth group is assigned to one of said non-overlapping sub-intervals of time according to the numerical order of said vehicles in said kth group.

7. The method of claim 1, wherein said step of causing the communications unit for each of said selected set of vehicles that is available to respond to a call for assistance and that is within said selected distance D from the location specified in the assistance message to reply to the assistance message comprises the steps of:

causing said location determination means for each of said vehicles to determine a distance $d(n)$ from its present location to said location specified in said assistance message, where n is the number of said vehicle;

for each of said vehicles for which the distance $d(n)$ satisfies the relation $d(n) \leq D$, causing such vehicle to transmit the distance $d(n)$ and the status of said vehicle to said central station beginning at a time $\Delta t(n)$ after said vehicle receives said assistance message from said central station, where $\Delta t(n) \geq Md(n)(T-\tau)/D + \Delta t_0$, where M is a selected positive constant, T is a selected cut-off time for transmission of a reply by said vehicle, $\tau$ is a selected transmission response time for said vehicle communications unit, and $\Delta t_0$ is an arbitrary small time value.

8. The method of claim 7, further comprising the step of choosing said constant $M \approx 1$, said cut-off time T to be in the range 2–20 sec, said transmission time $\tau$ to be in the range 50–500 msec, and said distance D to be in the range 0.5–3 miles.

9. The method of claim 7, further comprising the step of causing one of said selected set of vehicles to refrain from replying to said assistance message received from said central station, if this reply would be transmitted at a time greater than said time T after said assistance message is received by said vehicle.

10. The method of claim 1, wherein said step of causing the communications unit for each of said selected set of vehicles that is available to respond to said call for assistance and that is within a selected distance D from the location specified in said assistance message to reply to said assistance message comprises the steps of:

causing said location determination means for each of said vehicles to determine said distance $d(n)$ from its present location to said location specified in said assistance message, where n is the number of said vehicle;

for each of said vehicles for which said distance $d(n)$ satisfies the relation $d(n) \leq D$, causing said vehicle to transmit the status and present location coordinates of said vehicle to said central station beginning at a time $\Delta t(n)$ after said vehicle receives said assistance message from said central station, where $\Delta t(n) \geq Md(n)(T-\tau)/D+\Delta t_0$, where M is a selected positive constant, T is a selected cut-off time for transmission of a reply by said vehicle, $\tau$ is a selected transmission response time for said vehicle communications unit, and $\Delta t_0$ is an arbitrary small time value.

11. The method of claim 10, further comprising the step of choosing said constant $M \approx 1$, said cut-off time T to be in the range 2–20 sec, said transmission time $\tau$ to be in the range 50–500 msec, and said distance D to be in the range 0.5–3 miles.

12. The method of claim 10, further comprising the step of causing one of said selected set of vehicles to refrain from replying to said assistance message received from said central station, if this reply would be transmitted at a time greater than said time T after said assistance message is received by said vehicle.

13. The method of claim 1, further comprising the step of causing said central station to select at least one of said selected set of vehicles to respond to said call for assistance based solely upon said reply first received from said vehicles.

14. The method of claim 1, further comprising the step of causing said central station to select one of said selected set of vehicles to respond to said call for assistance based upon said reply first received from said vehicles that contains selected equipment needed to respond to said call for assistance.

15. The method of claim 1, further comprising the step of causing said central station to select one of said selected set of vehicles to respond to said call for assistance based upon said reply first received from said vehicles that has at least one vehicle occupant with selected training needed to respond to said call for assistance.

16. The method of claim 1, further comprising the step of determining said present location of said location determination-means at each of a sequence of consecutive times that are on average no more than one second apart.

17. The method of claim 1, further comprising the step of choosing said location determination means from the class of satellite-based location determination systems consisting of a Global Positioning System and a Global Orbiting Navigational System.

18. The method of claim 1, further comprising the step of choosing said location determination means from the class of ground-based systems consisting of a Loran system, an Omega system, a Decca system, a Tacan system, a Microwave Landing System, a Joint Tactical Information Distribution System, a Position Locator and Reporting System, and an inertial navigation system.

19. The method of claim 1, further comprising the step of choosing said location determination means to be an FM subcarrier signal system.

20. Apparatus for directing a vehicle drawn from a plurality of vehicles to respond to a call for assistance received at a central station that communicates with these vehicles, the apparatus comprising:

a central processing station, which receives calls for assistance, having a transceiver that transmits radio wave signals to and receives radio wave signals from each of a selected set of N vehicles ($N \geq 2$) at a first selected frequency, where the central station obtains information on the present location and present status of each of the set of N vehicles at a sequence of consecutive times;

a vehicle communications unit that is provided on each of the set of N vehicles, the communications unit comprising:

location determination means for receiving radio wave location determination signals at a second selected frequency and for processing these location determination signals to determine the present location coordinates of the location determination means at each of a sequence of consecutive times that are on average no more than five seconds apart;

transceiver means for transmitting radio wave signals to, and receiving radio wave signals from, the central station transceiver at the first selected frequency; and an interface and transceiver controller, connected to the location determination means and the transceiver means and for controlling the transceiver means, that allows communication of information between the location determination means and the transceiver controller, that processes a radio wave signal received from the central station, that determines what signal the transceiver means should transmit in response to a radio wave signal received from the central station, and that determines the present status of the vehicle associated with the communications unit;

where the central station and the vehicle communications units communicate with each other so that when the central station receives a call for assistance and the location of the caller for that assistance, the central station transmits to the group of N vehicles an assistance message containing this location and available information concerning the assistance required;

each of the set of N vehicles that is available to respond to a call for assistance, determines its distance d from the location specified in the assistance message, and if the distance d is no greater than a selected distance D, the vehicle communications unit associated with this vehicle replies to the assistance message by transmitting the vehicle status and information allowing determination of the distance d to the central station; and the central station selects one or more of the set of N vehicles to respond to the call for assistance and notifies each selected vehicle of its selection to respond to the call for assistance.

21. The apparatus of claim 20, wherein:

each of said set of N vehicles is assigned to one of K groups, numbered $k=1, 2, \ldots, K$ with $K \geq 2$, of such vehicles;

said central station transmits a request for information on said present location and said present status of each vehicle in the kth group at each of a sequence of consecutive times, for $k=1, 2, \ldots, K$, where any two groups of vehicles receive such information requests at different times; and said communications unit in each of said vehicles in the kth group responds to the information request transmitted to the kth group by transmitting to said central station said present status and information allowing determination of said present location of said vehicle in the kth group, in a selected information response time interval following receipt by said vehicles in the kth group of the information request.

22. The method of claim 21, wherein:

each of said vehicles in said kth group is assigned to a selected non-overlapping sub-interval of time within said selected information response time interval; and each of said vehicles in said kth group transmits to said central station information on said present location and present status of said vehicle within the sub-interval of time assigned to said vehicle.

23. The method of claim 22, wherein the sum of said selected non-overlapping sub-intervals of time is substantially equal to said selected information response time interval for said kth group of vehicles.

24. The method of claim 21, wherein the frequency of transmission of said information requests for a selected first group of said set of N vehicles differs from the frequency of transmission of said information requests for a selected second group of said set of N vehicles.

25. The apparatus of claim 20, wherein said location determination means for each of said set of N vehicles determines a distance $d(n)$ from its present location to said location specified in said assistance message, where n is the number of said vehicle (n=1, 2, ..., N);

for each of said set of N vehicles for which the distance $d(n)$ satisfies the relation $d(n) \leq D$, said vehicle transmits the distance $d(n)$ and the status of said vehicle to said central station beginning at a selected time $\Delta t(n)$ after said vehicle receives said assistance message from said central station, where $\Delta t(n) \geq Md(n)(T-\tau)/D + \Delta t_0$, where M is a selected positive constant, T is a selected cut-off time for transmission of a reply by said vehicle, $\tau$ is a selected transmission response time for said vehicle communications unit, and $\Delta t_0$ is an arbitrary small time value.

26. The apparatus of claim 25, wherein said constant $M \approx 1$, said cut-off time T is in the range 2–20 sec, said transmission time $\tau$ is in the range 50–500 msec, and said distance D is in the range 0.5–3 miles.

27. The apparatus of claim 25, wherein said vehicle in said set of N vehicles refrains from replying to said assistance message received from said central station if this reply would be transmitted at a time greater than said time T after said assistance message is received by said vehicle.

28. The apparatus of claim 20, wherein said location determination means for each of said set of N vehicles determines said distance $d(n)$ from its present location to said location specified in said assistance message, where n is the number of said vehicle (n=1, 2, ..., N);

for each of said set of N vehicles for which said distance $d(n)$ satisfies the relation $d(n) \leq D$, said vehicle becomes a transmitting vehicle and transmits the status and present location coordinate of said vehicle to said central station beginning at a time $\Delta t(n)$ after said vehicle receives said assistance message from said central station, where $\Delta t(n) \geq Md(n)(T-\tau)/D + \Delta t_0$, where M is a selected positive constant, T is a selected cut-off time for transmission of a reply by said vehicle, $\tau$ is a selected transmission response time for said vehicle communications unit, and $\Delta t_0$ is an arbitrary small time value.

29. The apparatus of claim 28, wherein said constant $M \approx 1$, said cut-off time T is in the range 2–20 sec, said transmission time $\tau$ is in the range 50–500 msec, and said distance D is in the range 0.5–3 miles.

30. The apparatus of claim 28, wherein said transmitting vehicle refrains from replying to said assistance message received from said central station if this reply would be transmitted at a time greater than said time T after said assistance message is received by said transmitting vehicle.

31. The apparatus of claim 20, wherein said central station selects at least one of said set of N vehicles to respond to said call for assistance based solely upon said reply first received from each of said set of N vehicles.

32. The apparatus of claim 20, wherein said central station selects a vehicle from said set of N vehicles to respond to said call for assistance based upon said reply first received from said vehicle that contains selected equipment needed to respond to said call for assistance.

33. The apparatus of claim 20, wherein said central station selects a vehicle from said set of N vehicles to respond to said call for assistance based upon said reply first received from said vehicle that has at least one occupant with selected training needed to respond to said call for assistance.

34. The method of claim 20, wherein said present location of said location determination means is determined at each of a sequence of consecutive times that are on average no more than one second apart.

* * * * *